United States Patent
Kujubu et al.

(10) Patent No.: US 10,858,010 B2
(45) Date of Patent: Dec. 8, 2020

(54) CONTROL METHOD FOR ELECTRIC VEHICLE AND CONTROL DEVICE FOR ELECTRIC VEHICLE

(71) Applicant: Nissan Motor Co., Ltd., Yokohama (JP)

(72) Inventors: Naoteru Kujubu, Kanagawa (JP);
Tatsuya Suzuki, Kanagawa (JP);
Ikuma Shindo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/479,862

(22) PCT Filed: Jan. 24, 2017

(86) PCT No.: PCT/JP2017/002382
§ 371 (c)(1),
(2) Date: Jul. 22, 2019

(87) PCT Pub. No.: WO2018/138780
PCT Pub. Date: Aug. 2, 2018

(65) Prior Publication Data
US 2020/0164885 A1    May 28, 2020

(51) Int. Cl.
*B60T 8/32* (2006.01)
*B60W 10/18* (2012.01)
(Continued)

(52) U.S. Cl.
CPC ......... *B60W 40/076* (2013.01); *B60T 8/3205* (2013.01); *B60W 10/188* (2013.01); *B60W 30/18127* (2013.01); *H02P 3/14* (2013.01)

(58) Field of Classification Search
CPC ............ B60W 40/076; B60W 10/188; B60W 30/18127; B60T 8/3205; B60T 8/00;
(Continued)

(56) References Cited

U.S. PATENT DOCUMENTS

| 6,033,041 A | 3/2000 | Koga et al. |
| 2009/0112386 A1 | 4/2009 | Saitoh et al. |

(Continued)

FOREIGN PATENT DOCUMENTS

| JP | 2000205015 A | 7/2000 |
| JP | 2002152903 A | 5/2002 |

(Continued)

*Primary Examiner* — Rodney A Butler
(74) *Attorney, Agent, or Firm* — Young Basile Hanlon & MacFarlane, P.C.

(57) ABSTRACT

The electric vehicle control method is a control method that includes the motor that gives braking force or driving force to a vehicle in accordance with an accelerator operation, by which the braking force is controlled when an accelerator operation amount is smaller than a given value and the driving force is controlled when the accelerator operation amount is the given value or larger. The electric vehicle control device estimates disturbance torque that acts on the motor as resistance component relating to a gradient and executes correction by which the braking force or the driving force is increased or decreased so as to cancel the resistance component in accordance with a disturbance torque estimated value Td. Then, on a downhill road at a given gradient or more, a correction amount of the braking force or the driving force is reduced.

5 Claims, 11 Drawing Sheets

(51) Int. Cl.
*B60W 30/18* (2012.01)
*H02P 3/14* (2006.01)
*B60W 40/076* (2012.01)
*B60W 10/188* (2012.01)

(58) Field of Classification Search
CPC ........ H02P 3/14; B60L 2240/423; B60L 7/26;
B60L 2250/28; B60L 2260/44; B60L
2240/642; B60L 2240/12; B60L 15/2027;
B60L 15/2081; B60L 7/18; B60L 50/51
See application file for complete search history.

(56) References Cited

U.S. PATENT DOCUMENTS

| | | | |
|---|---|---|---|
| 2012/0081063 A1* | 4/2012 | Iesaki | G05B 19/416 |
| | | | 318/601 |
| 2012/0245773 A1* | 9/2012 | Suzuki | B60L 15/20 |
| | | | 701/22 |
| 2016/0347202 A1 | 12/2016 | Sawada et al. | |

FOREIGN PATENT DOCUMENTS

| | | | |
|---|---|---|---|
| JP | 2009106130 A | 5/2009 | |
| JP | 2009303342 A | 12/2009 | |
| JP | 2015133799 A | 7/2015 | |
| WO | 2015105077 A1 | 7/2015 | |

\* cited by examiner

CONTROL METHOD FOR ELECTRIC VEHICLE AND CONTROL DEVICE FOR ELECTRIC VEHICLE

TECHNICAL FIELD

The present invention relates to a control method for an electric vehicle and a control device for an electric vehicle.

BACKGROUND

There is a known technology in an vehicle acceleration/deceleration control system by which deceleration is controlled in accordance with an accelerator operation amount when the accelerator operation amount is smaller than a given value, and acceleration is controlled in accordance with an accelerator operation amount when the accelerator operation amount is the given value of larger (see JP2000-205015A). With the acceleration/deceleration control system, it is possible to set target acceleration/deceleration in accordance with an accelerator operation amount. Therefore, with an accelerator operation amount having target acceleration/deceleration that is set to 0, it is possible to maintain constant vehicle speed even on a gradient road without needing an adjustment of the accelerator operation amount.

Here, in JP2000-205015A, in order to restrain changes in acceleration/deceleration and speed that change as a gradient of a road surface on which a vehicle travels changes, gradient correction is executed by which target acceleration/deceleration of the vehicle is corrected in accordance with the gradient of the road surface. Normally, a vehicle accelerates at a given or steeper descending gradient. However, in a vehicle in which the gradient correction is executed, since deceleration is additionally corrected on the descending gradient, large deceleration is generated in the vehicle even on the descending gradient, and a driver may have a sense of discomfort.

SUMMARY

An object of the present invention is to provide a technology that reduces a gradient correction amount that is determined in accordance with a magnitude of a gradient on a descending gradient, thereby restraining a driver from having a sense of discomfort.

According to one embodiment of the present invention, the electric vehicle control method is a control method that includes the motor that gives braking force or driving force to a vehicle in accordance with an accelerator operation, by which the braking force is controlled when an accelerator operation amount is smaller than a given value and the driving force is controlled when the accelerator operation amount is the given value or larger. The electric vehicle control device estimates disturbance torque that acts on the motor as resistance component relating to a gradient and executes correction by which the braking force or the driving force is increased or decreased so as to cancel the resistance component in accordance with a disturbance torque estimated value Td. Then, on a downhill road at a given gradient or more, a correction amount of the braking force or the driving force is reduced. An upper limit value of the correction amount is calculated based on a torque value that enables the vehicle to stop when the accelerator operation amount is 0 at the given gradient.

The following describes the embodiments of the present invention in detail with accompanying drawings.

DETAILED DESCRIPTION

Hereinafter, an example is described in which an electric vehicle control device according to the present invention is applied to an electric vehicle having an electric motor (hereinafter, also simply referred to as a motor) as a driving source.

Embodiment

Figure 1:
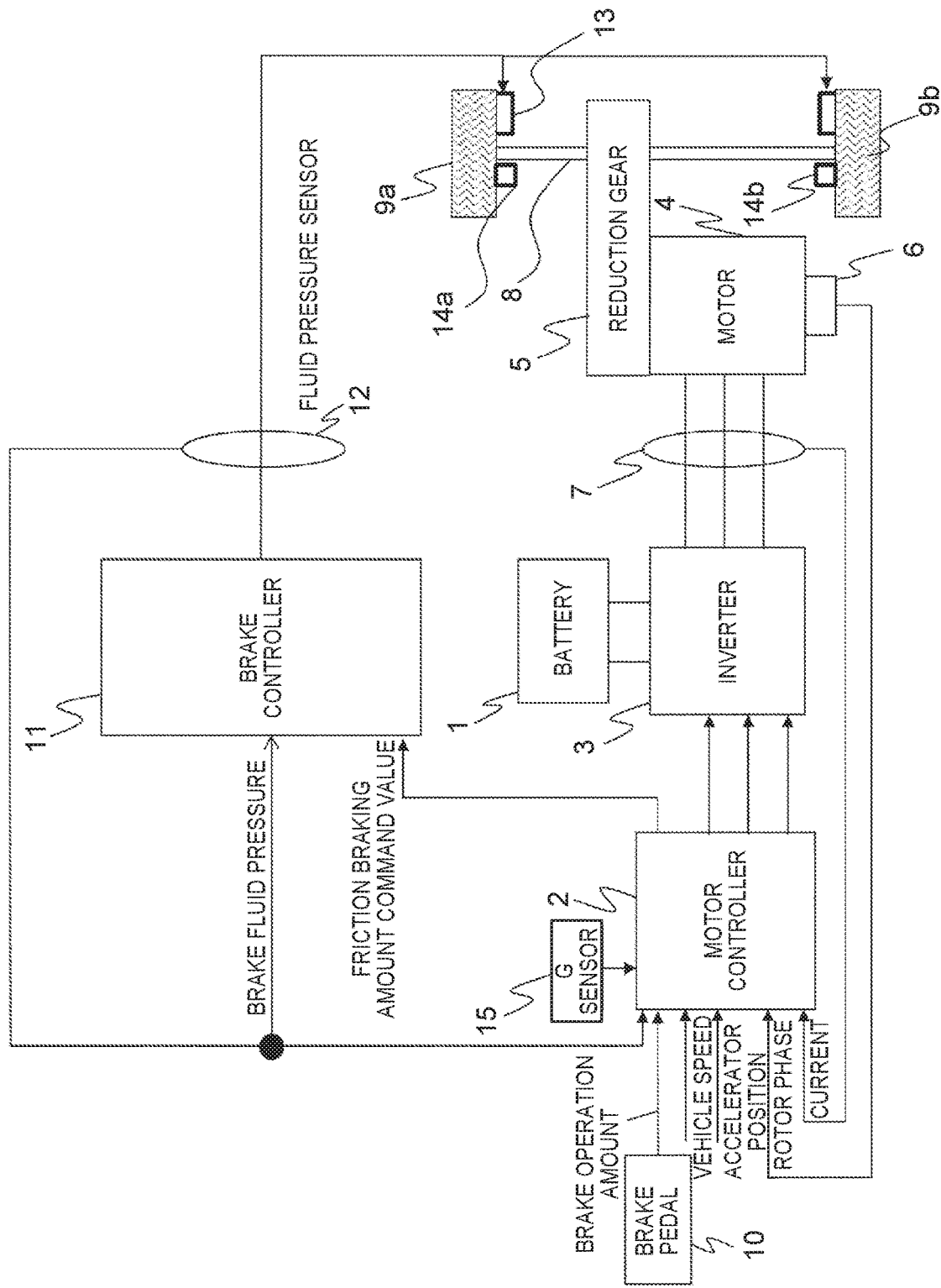
FIG. 1 is a block diagram of main components of an electric vehicle provided with an electric vehicle control device according to an embodiment.

FIG. 1 is a block diagram of main components of an electric vehicle that includes an electric vehicle control device according to an embodiment. The electric vehicle control device according to the present invention is provided with an electric motor as a part or all of a driving source of a vehicle, and is applicable to an electric vehicle that is able to travel with driving force of the electric motor. The electric vehicle is not only an electric car but may also be a hybrid car or a fuel-cell car. In particular, the electric vehicle control device according to the embodiment is applicable to a vehicle that is able to control acceleration, deceleration, and stoppage of the vehicle only with an operation of an accelerator pedal. In such a vehicle, a driver steps on the accelerator pedal to accelerate the vehicle, and the driver reduces a depression amount of the accelerator pedal that is stepped on, or brings the depression amount of the accelerator pedal to zero when the vehicle decelerates or stops. On an uphill road, a vehicle could approach a stopped state while stepping on the accelerator pedal in order to prevent the vehicle from moving backward.

Signals indicating vehicle statuses such as vehicle speed V, an accelerator position θ, a rotor phase α of a motor (a three-phase alternating current motor) 4, and three-phase alternating currents iu, iv, iw of the motor 4 are input to a motor controller 2 as digital signals. The motor controller 2 generates a PWM signal for controlling the motor 4 based on the input signals. Further, the motor controller 2 controls a switching element of an inverter 3 to open and close in accordance with the generated PWM signal. The motor controller 2 also generates a friction braking amount command value in accordance with an amount of an accelerator operation or an amount of an operation of a brake pedal 10 by a driver.

The motor controller 2 also functions as a controller that controls braking force generated in a vehicle when an amount of an accelerator operation (an accelerator position (an accelerator opening degree)) is smaller than a given value, and controls driving force generated in the vehicle when an accelerator operation amount is a given value or larger.

The inverter 3 turns on and off two switching elements (for example, power semiconductor elements such an IGBT and a MOS-FET) provided for each phase, and thus converts a direct current provided by a battery 1 into an alternating current so that a desired current flows in the motor 4.

The motor 4 generates driving force by using the alternating current supplied from the inverter 3, and transmits the driving force to left and right drive wheels 9a, 9b through a reduction gear 5 and a drive shaft 8. The motor 4 also generates regenerative driving force when the motor 4 is rotated together with the drive wheels 9a, 9b when the vehicle travels, and thus recovers kinetic energy of the vehicle as electric energy. In this case, the inverter 3 converts an alternating current generated during the regenerative operation of the motor 4 into a direct current, and supplies the direct current to the battery 1.

An electric current sensor 7 detects the three-phase alternating currents Iu, Iv, Iw flowing in the motor 4. However, since the sum of the three-phase alternating currents Iu, Iv, Iw is 0, currents in any two phases may be detected, and a current in the remaining one phase may be obtained by computation.

A rotation sensor 6 is, for example, a resolver or an encoder, and detects the rotor phase α of the motor 4.

A brake controller 11 outputs a brake actuator command value to a friction brake 13. With the brake actuator command value, brake fluid pressure is generated in accordance with the friction braking amount command value generated in the motor controller 2.

A fluid pressure sensor 12 functions as braking amount detection means, detects brake fluid pressure of the friction brake 13, and outputs the detected brake fluid pressure (a friction braking amount) to the brake controller 11 and the motor controller 2.

The friction brake 13 is provided in each of the left and right drive wheels 9a, 9b, and generates braking force in the vehicle by pressing a brake pad onto a brake rotor in accordance with the brake fluid pressure.

When maximum regenerative braking torque is insufficient for a driver's intended braking torque calculated from an accelerator operation amount, vehicle speed, and so on, the friction braking force generated by the friction brake 13 functions as braking force that is used in accordance with the friction braking amount command value output from the motor controller 2. Also, even when a driver's intended braking force is smaller than the maximum regenerative braking torque, the friction braking force is used when braking force desired by a driver cannot be covered only by regenerative braking torque because the regenerative electric power is limited when the battery 1 is fully charged, the motor 4 is protected from heat, and so on. Moreover, the friction braking force is not only requested in accordance with an accelerator operation amount but also used for achieving braking force desired by a driver's brake pedal operation amount.

A longitudinal G sensor 15 mainly detects longitudinal acceleration and outputs the detection value to the motor controller 2. Thus, the motor controller 2 is able to calculate a disturbance torque component that almost coincides with gradient resistance that acts on the motor 4 based on the value detected by the longitudinal G sensor.

Figure 2:
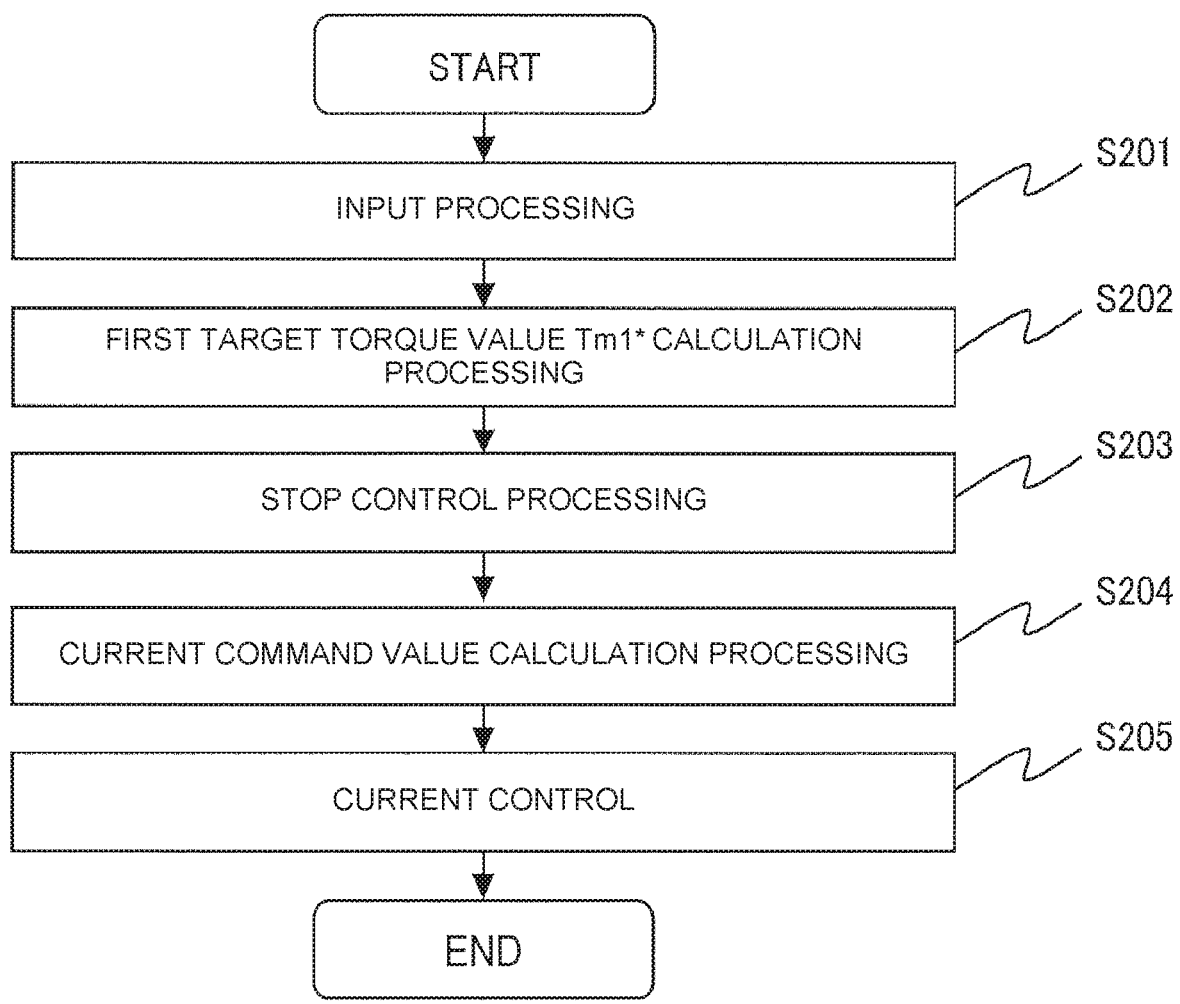
FIG. 2 is a flowchart showing a flow of processing of motor current control, the processing being executed by a motor controller provided in the electric vehicle control device according to the embodiment.

FIG. 2 is a flowchart showing a flow of motor current control processing that is programmed so as to be executed by the motor controller 2.

In step S201, signals indicating vehicle statuses are input to the motor controller 2. Here, vehicle speed V (m/s), an accelerator position θ (%), a rotor phase α (rad) of the motor 4, rotation speed Nm (rpm) of the motor 4, three-phase alternating currents iu, iv, iw flowing in the motor 4, a direct current voltage value $Vac_{dc}$ (V) between the battery 1 and the inverter 3, a brake operation amount, and brake fluid pressure are input.

The vehicle speed V (km/h) is wheel speed of the wheels (the drive wheels 9a, 9b) that transmit driving force when a vehicle is being driven. The vehicle speed V is acquired by wheel speed sensors 11a, 11b or through communication from another controller (not shown). Alternatively, the vehicle speed V (km/h) is obtained as follows. A rotor mechanical angular velocity ωm is multiplied by a tire dynamic radius r, and then divided by a gear ratio of final gear, and vehicle speed v (m/s) is thus obtained. Then, the vehicle speed v (m/s) is multiplied by 3600/1000 in order to convert the unit.

As an indicator of an accelerator operation amount by a driver, the accelerator position θ (%) is acquired by an accelerator position sensor (not shown) or through communication from another controller such as a vehicle controller (not shown).

The rotor phase α (rad) of the motor 4 is acquired from the rotation sensor 6. The rotation speed Nm (rpm) of the motor 4 is obtained as follows. Rotor angular velocity ω (an electric angle) is divided by the number of pole pairs p of the motor 4 so that motor rotation speed ωm (rad/s) that is mechanical angular velocity of the motor 4 is obtained. Then, the obtained motor rotation speed ωm is multiplied by 60/(2π), thereby the rotation speed Nm (rpm) is obtained. The rotor angular velocity ω is obtained by differentiating the rotor phase α.

The three-phase alternating currents iu, iv, iw (A) flowing in the motor 4 are acquired from the electric current sensor 7.

The direct current voltage value $V_{dc}$ (V) is obtained from a voltage sensor (not shown) provided in a direct current power source line between the battery 1 and the inverter 3, or from a power supply voltage value sent from a battery controller (not shown).

The braking amount is acquired from a brake fluid pressure sensor value detected by the fluid pressure sensor 12. A value detected by a stroke sensor (not shown) or the like that detects a stepping-on amount of a brake pedal by a driver's pedal operation (a brake operation amount) may be used instead as the braking amount.

In target torque value calculation processing in step S202, the motor controller 2 sets a first target torque value Tm1*. Specifically, first of all, with reference to an accelerator position—torque table shown in FIG. 3 that represents an aspect of a driving force characteristic that is calculated in accordance with the accelerator position θ and the motor rotation speed ωm input in step S201, a target basic torque value Tm0* (a target torque value) is set as torque requested by a driver. Next, a disturbance torque estimated value Td that almost coincides with gradient resistance is obtained. Then, the disturbance torque estimated value Td is added to the target basic torque value Tm0* as gradient assist torque, thereby setting the first target torque value Tm1* in which a gradient resistance component is canceled.

However, in the embodiment, when a driver requests deceleration, deceleration control processing is executed in which the gradient assist torque amount to be added to the target basic torque value Tm0* is reduced in accordance with a road surface gradient. Details of the deceleration control processing that is characteristic processing of the present invention are described later.

Figure 3:
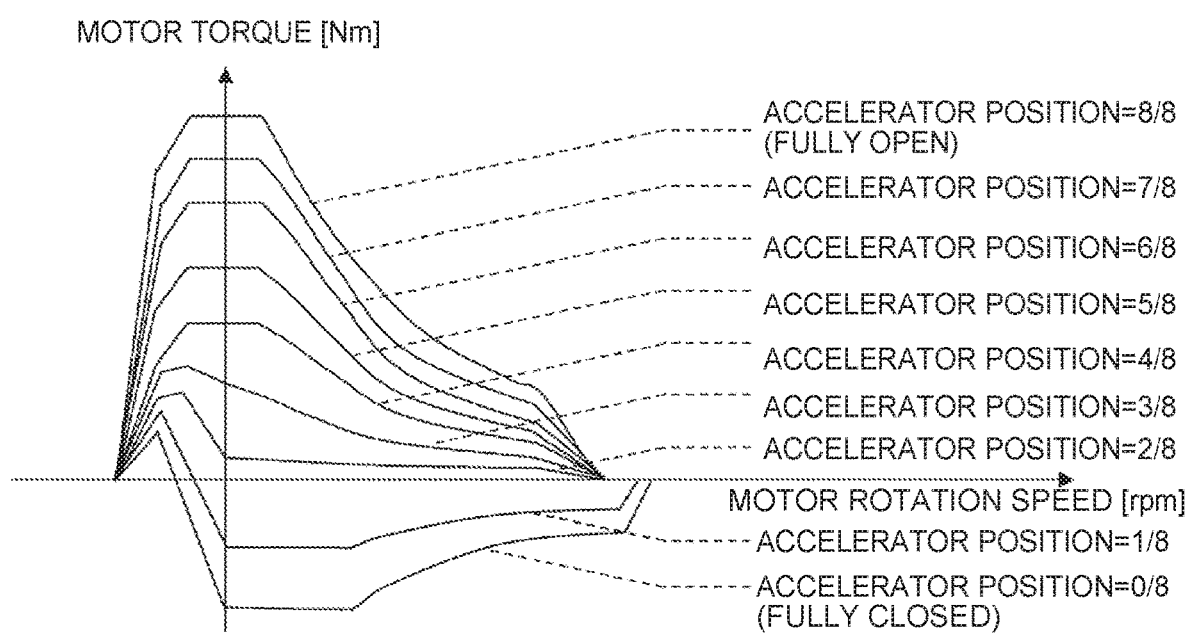
FIG. 3 is a view of an example of an accelerator position (an accelerator opening degree)—torque table.

As described above, the electric vehicle control device according to the embodiment is applicable to a vehicle that is able to control acceleration, deceleration, and stoppage of the vehicle only by operating the accelerator pedal, and it is possible to stop the vehicle by completely closing the accelerator pedal at least on a road surface with a given gradient or smaller. Therefore, in the accelerator position—torque table shown in FIG. 3, negative motor torque is set so that regenerative braking force works when the accelerator position is 0 (fully closed) through ⅛. However, the accelerator position—torque table shown in FIG. 3 is only an example and is not limited to this.

In the embodiment, a maximum value of the gradient assist amount, that is an upper limit value of an absolute value of the gradient assist torque is set in consideration of safety and so on. The upper limit value in the embodiment is set to a value equivalent to an absolute value of braking torque that makes a vehicle stop by being added to braking force generated in the vehicle when an accelerator operation amount is 0 on a downhill road with a −10% gradient.

In step S203, the controller 2 executes stop control processing. Specifically, the controller 2 determines whether or not it is just before stop of a vehicle, and when it is not just before stop of the vehicle, the first target torque value Tm1* calculated in step S202 is set to a motor torque command value Tm*. When it is just before stop of the vehicle, a second target torque value Tm2* is set to the motor torque command value Tm*. The second target torque value Tm2* converges to the disturbance torque estimated value Td as the motor rotation speed decreases. The second target torque value Tm2* is positive torque on an uphill road, negative torque on a downhill road, and almost zero on a flat road.

Further, during the stop control processing in which the second target torque value Tm2* is set to the motor torque command value Tm*, deceleration reduction processing described later is not executed. This means that, during the stop control processing, since the motor torque command value Tm* converges to the disturbance torque estimated value Td that almost coincides with the gradient resistance, the vehicle stops smoothly and remains stopped only with an accelerator operation regardless of a gradient of a road surface.

In next step S204, the controller 2 executes current command value calculation processing. Specifically, a target d-axis current value id* and a target q-axis current value iq* are obtained based on the motor rotation speed wm and the direct current voltage value Vdc in addition to the target torque value Tm* (the motor torque command value Tm*) calculated in step S203. For example, a table is prepared that defines relations among the torque command value, the motor rotation speed, and the direct current voltage value, and the target d-axis current value and the target q-axis current value, and the target d-axis current value id* and the target q-axis current value iq* are obtained with reference to the table.

In step S205, current control is executed so that a d-axis current id and a q-axis current iq coincide with the target d-axis current value id* and the target q-axis current value iq* obtained in step S204, respectively. In order to do so, first of all, the d-axis current id and the q-axis current iq are obtained based on the three-phase alternating currents iu, iv, iw and the rotor phase α of the motor 4 that are input in step S201. Next, from respective deviations between the d-axis and q-axis current command values id*, iq* and the d-axis and q-axis currents id, iq, d-axis and q-axis voltage command values vd, vq are calculated. A non-interference voltage that is necessary to cancel interference voltage between d-q orthogonal coordinates may be added to the calculated d-axis and q-axis voltage command values vd, vq.

Then, three-phase alternating current voltage command values vu, vv, vw are obtained from the d-axis and q-axis voltage command values vd, vq, and the rotor phase α of the motor 4. PWM signals tu (%), tv (%), tw (%) are obtained from the obtained three-phase alternating current voltage command values vu, vv, vw and the direct current voltage value Vdc. As the switching element of the inverter 3 is opened and closed by the PWM signals tu, tv, tw obtained as described above, it is possible to drive the motor 4 with desired torque instructed by the motor torque command value Tm*.

The processing executed in step S202 in FIG. 2, in other words, a method for setting the first target torque value Tm1* is described in detail with reference to FIG. 4.

A target basic torque value setter 401 refers to the accelerator position—torque table shown in FIG. 3 and sets the target basic torque value Tm0* based on an accelerator position and motor rotation speed ωm.

A disturbance torque estimator 402 obtains the disturbance torque estimated value Td based on the motor torque command value Tm*, the motor rotation speed ωm, and a braking amount B.

Figure 5:
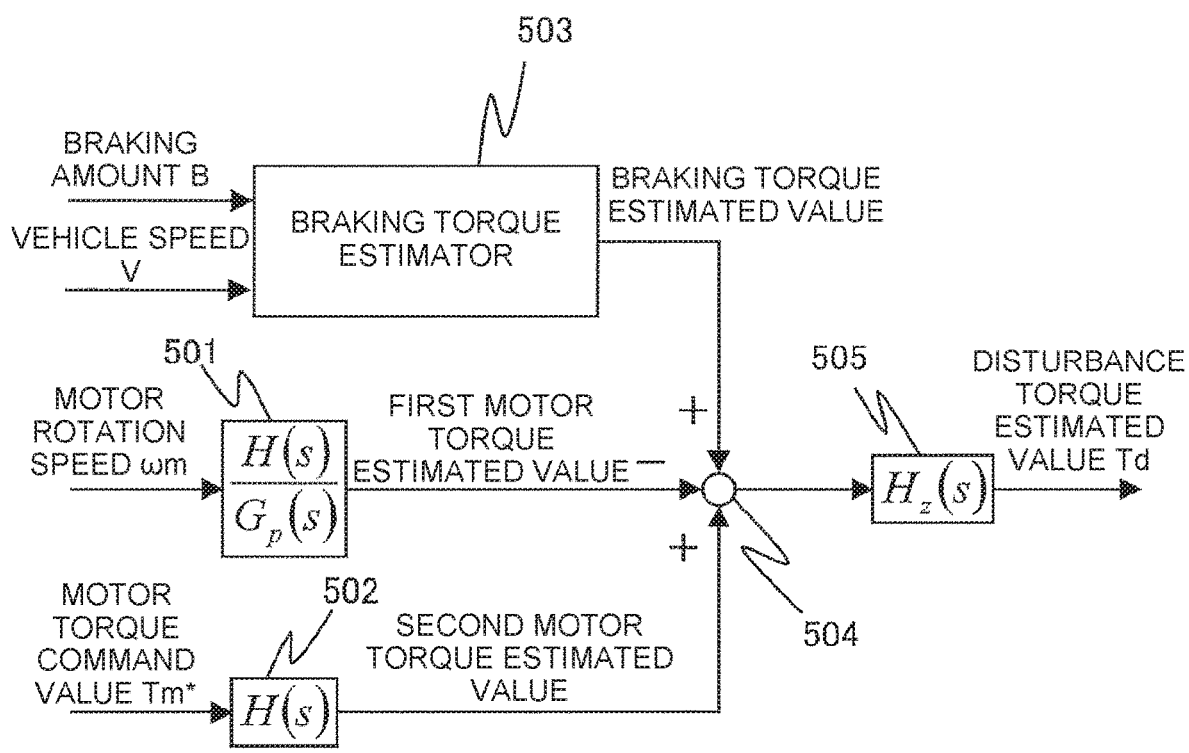
FIG. 5 is a view describing a method for calculating a disturbance torque estimated value.

FIG. 5 is a detailed block diagram of the disturbance torque estimator 402. The disturbance torque estimator 402 includes a control block 501, a control block 502, a braking torque estimator 503, an adder/subtracter 504, and a control block 505.

The control block 501 serves a function as a filter having a transfer characteristic of H(s)/Gp(s), and executes filtering processing of the motor rotation speed ωm that is input to the control block 501, thereby calculating a first motor torque estimated value. Gp(s) is a transfer characteristic from motor torque Tm through the motor rotation speed ωm, and details of Gp(s) are given later. H(s) is a low pass filter having a transfer characteristic in which a difference between a degree of a denominator and a degree of a numerator of H(s) becomes a difference between a degree of a denominator and a degree of a numerator of the transfer characteristic Gp(s) or larger.

The control block 502 serves a function as a low pass filter having a transfer characteristic of H(s), and executes filtering processing of the motor torque command value Tm* that is input to the control block 502, thereby calculating a second motor torque estimated value.

The braking torque estimator 503 calculates a braking torque estimated value based on the braking amount B and the vehicle speed V. In the braking torque estimator 503, the braking torque estimated value is calculated in consideration of multiplication processing for performing conversion from the braking amount B into motor shaft torque, responsiveness from a fluid pressure sensor value detected by the fluid pressure sensor 12 until actual braking force, and so on.

Since the braking force by the friction brake 13 acts in a deceleration direction when a vehicle moves both forward and backward, it is necessary to invert a sign of the braking torque estimated value in accordance with a sign of vehicle longitudinal speed (vehicle body speed, wheel speed, motor rotation speed, drive shaft rotation speed, or other speed parameter proportional to vehicle speed). Therefore, in accordance with the vehicle speed V that is input, the braking torque estimator 503 sets a sign of the braking torque estimated value to a negative sign when the vehicle moves forward, and to a positive sign when the vehicle moves backward.

The adder/subtracter 504 subtracts the first motor torque estimated value from the second motor torque estimated value, and also adds a braking torque correction value. In the adder/subtracter 504, since the braking torque correction value having a negative sign with respect to an advancing direction of the vehicle is added, it is possible to calculate at a later stage the disturbance torque estimated value Td in which braking torque caused by the braking amount B is canceled. The calculated value is output to the control block 505.

The control block 505 is a filter having a transfer characteristic of Hz(s), and executes filtering processing of an output of the adder/subtracter 504, thereby calculating the disturbance torque estimated value Td. Then, the control block 505 outputs the disturbance torque estimated value Td to the gradient correction amount adjuster 403 shown in FIG. 4. Details of Hz(s) are described later.

Referring back to FIG. 4, the description continues. Conventionally, the disturbance torque estimated value Td calculated in the disturbance torque estimator 402 is input to an adder 404 and added to the target basic torque value Tm0*. Thus, gradient correction of the target basic torque value Tm0* is executed based on the disturbance torque estimated value Td, and a gradient assist torque corresponding to a gradient resistance component is added. Thus, the first target torque value Tm1* in which the gradient resistance component is canceled is calculated. Therefore, even when, for example, a vehicle travels on a road surface with various gradients at a constant accelerator position, it is possible to maintain uniform speed without any influence of the gradient resistance component.

However, when there is absolutely no influence of the gradient resistance component on acceleration and deceleration due to such gradient correction, a driver may have a sense of discomfort because the driver does not feel any influence on acceleration and deceleration that is expected from a gradient. For example, while a vehicle is traveling on a downhill road (a descending gradient), when a gradient becomes steeper suddenly and deceleration is corrected to increase, even greater deceleration is generated in the vehicle even though the descending gradient is steeper. In such an occasion, the driver traveling on the downhill road instinctively expects that the vehicle accelerate as the gradient becomes steeper. Therefore, large deceleration generated against such expectation gives the driver a sense of discomfort.

In the embodiment, in view of drive feeling, deceleration reduction processing is executed in order to restrain this kind of sense of discomfort at the time when a driver makes a deceleration request. The deceleration reduction processing reduces a magnitude of gradient assist torque (a gradient assist amount) in accordance with a gradient of a road surface on which a vehicle is traveling. Hereinafter, a configuration for executing the deceleration reduction processing is described.

Figure 4:
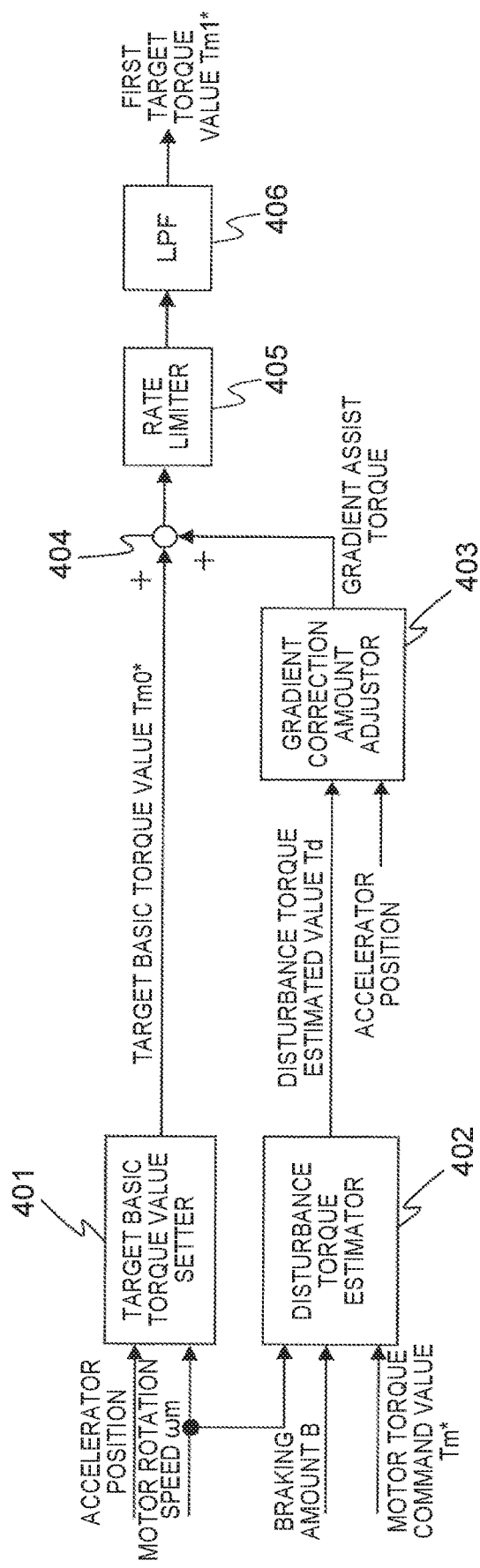
FIG. 4 is a view describing a method for calculating a first target torque value according to the embodiment.

A gradient correction amount adjuster 403 shown in FIG. 4 is a configuration for executing the deceleration reduction processing. The disturbance torque estimated value Td estimated in the disturbance torque estimator 402, and the accelerator position are input to the gradient correction amount adjuster 403, and the gradient correction amount adjuster 403 calculates gradient assist torque after the deceleration reduction processing. To be more specific, in view of drive feeling, the gradient correction amount adjuster 403 calculates a sensually optimized reduction rate of a gradient correction amount from a gradient of a road surface that can be detected from the disturbance torque estimated value Td, and a driver's acceleration/deceleration request that can be detected from the accelerator position. Then, gradient assist torque is calculated by multiplying the disturbance torque estimated value Td that is input to the gradient correction amount adjuster 403 by the calculated reduction rate of the gradient correction amount. As a result, the gradient assist torque is calculated that is adjusted to a gradient assist amount that does not give a driver a sense of discomfort. A method for setting the reduction rate of the gradient correction amount with regard to the calculation of the gradient assist torque is detailed later.

In the adder 404, the first target torque value Tm1* before limiter processing is calculated by adding the target basic torque value Tm0* serving as the driver request torque calculated in the target basic torque value setter 401 to the gradient assist torque calculated in the gradient correction amount adjuster 403. The first target torque value Tm1* before the limiter processing is input to a rate limiter 405.

The rate limiter 405 limits an upper limit of a rate of change of the first target torque value Tm1*. Thus, it is possible to prevent a steep change of the target torque value. The upper limit of the rate of change may be changed in accordance with vehicle speed. Further, an output of the rate limiter 405 is input to a low pass filter 406 in order to remove high-frequency noise and so on.

The low pass filter 406 is a low pass filter configured so as to remove a high-frequency noise component, and calculates the first target torque value Tm1* as a braking/driving torque command value by executing filtering processing for the output of the rate limiter 405.

With the first target torque value Tm1* calculated as above, it is possible to reduce a driver's accelerator operation amount (a stroke amount) without generating a sense of discomfort, and it is possible to improve drive feeling especially when a vehicle travels on a gradient road.

Before description of the deceleration control processing, the transfer characteristic Gp(s) from the motor torque Tm to the motor rotation speed wm in the electric vehicle control device according to the embodiment is described here. The transfer characteristic Gp(s) is used as a vehicle model in which a driving force transfer system of a vehicle is modeled, when a disturbance torque estimated value is calculated.

Figure 6:
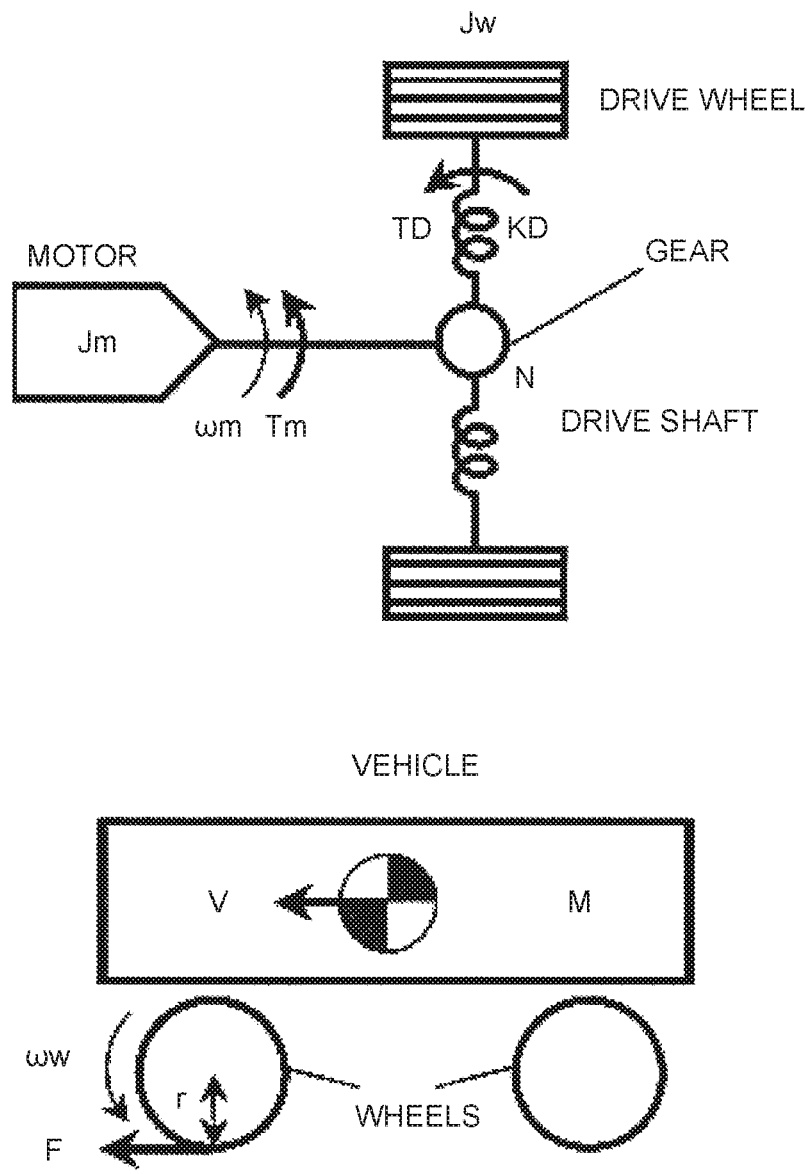
FIG. 6 is a view of modeling of a driving force transfer system in a vehicle.

FIG. 6 is a view of modeling of a driving force transfer system in a vehicle, and parameters in the drawing are as follows.

$J_m$: Inertia of the electric motor
$J_w$: Inertia of the drive wheel
$M$: Vehicle weight
$K_d$: Torsion rigidity of a drive system
$K_t$: Coefficient with respect to friction between a tire and a road surface N: Overall gear ratio
r: Load radius of the tire
$\omega_m$: Motor rotation speed
$T_m^*$: Target torque value Tm*
$T_d$: Torque of a drive wheel
F: Force applied to a vehicle
V: Vehicle speed
$\omega_w$: Angular velocity of the drive wheel Then, the following motion equations are derived from FIG. 6.

[Equation 1]

$$J_m \cdot \omega_m^* = T_m - T_d/N \qquad (1)$$

[Equation 2]

$$2J_w \cdot \omega_w^* = T_d - rF \qquad (2)$$

[Equation 3]

$$M \cdot V^* = F \qquad (3)$$

[Equation 4]

$$T^d = K_d \cdot \int (\omega_m/N - \omega_w) dt \qquad (4)$$

[Equation 5]

$$F = K_t \cdot (r\omega_w - V) \qquad (5)$$

The asterisk (*) stated on the upper right of each sign in Equation 1-Equation 3 expresses a time deferential.

When the transfer characteristic Gp(s) from the motor torque Tm to the motor rotation speed corn of the motor 4 is obtained based on the motion equations stated in Equation 1-Equation 5, the transfer characteristic Gp(s) is expressed by next Equation 6.

[Equation 6]

$$G_p(s) = \frac{b_3 s^3 + b_2 s^2 + b_1 s + b_0}{s(a_4 s^3 + a_3 s^2 + a_2 s + a_1)} \qquad (6)$$

The parameters in Equation 6 are expressed in Equations 7 below.

[Equations 7]

$a_4 = 2J_m J_w M$ $a_3 = J_m(2J_w + Mr^2)K_t$ $a_2 = (J_m + 2J_w/N^2)M \cdot K_d$ $a_1 = (J_m + 2J_w/N^2 + Mr^2/N^2)K_d \cdot K_t$ $b_3 = 2J_w \cdot M$ $b_2 = (2J_w + Mr^2)K_t$ $b_1 = M \cdot K_d$ $b_0 = K_d \cdot K_t \qquad (7)$ By examining poles and zeros of the transfer function shown in Equation 6, Equation 6 is able to approximate a transfer function stated in next Equation 8, and one pole and one zero show values that are extremely close to each other. This is equivalent to that $\alpha$ and $\beta$ in next Equation 8 are values that are extremely close to each other.

[Equation 8]

$$G_p(s) = \frac{(s+\beta)(b_2' s^2 + b_1' s + b_0')}{s(s+\alpha)(a_3' s^2 + a_2' s + a_1')} \qquad (8)$$

Therefore, as pole-zero cancellation in Equation 8 (approximation to $\alpha=\beta$) is executed, Gp(s) constitutes a transfer characteristic of (secondary)/(third order) as shown in next Equation 9.

[Equation 9]

$$G_p(s) = \frac{(b_2' s^2 + b_1' s + b_0')}{s(a_3' s^2 + a_2' s + a_1')} \cdot \frac{\beta}{\alpha} \qquad (9)$$

Figure 7:
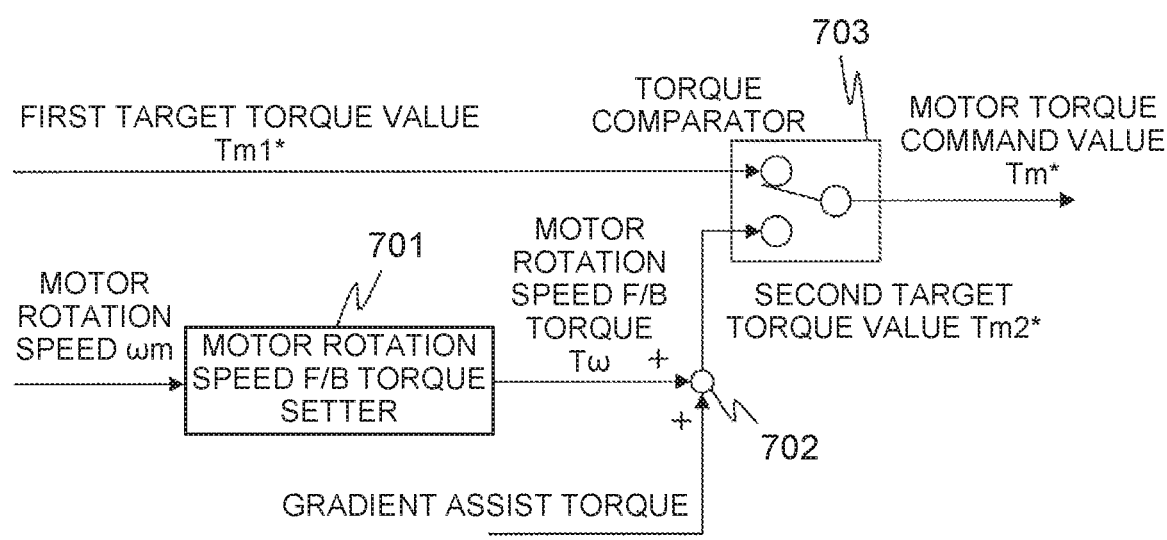
FIG. 7 is a block diagram realizing stop control processing.
Figure 8:
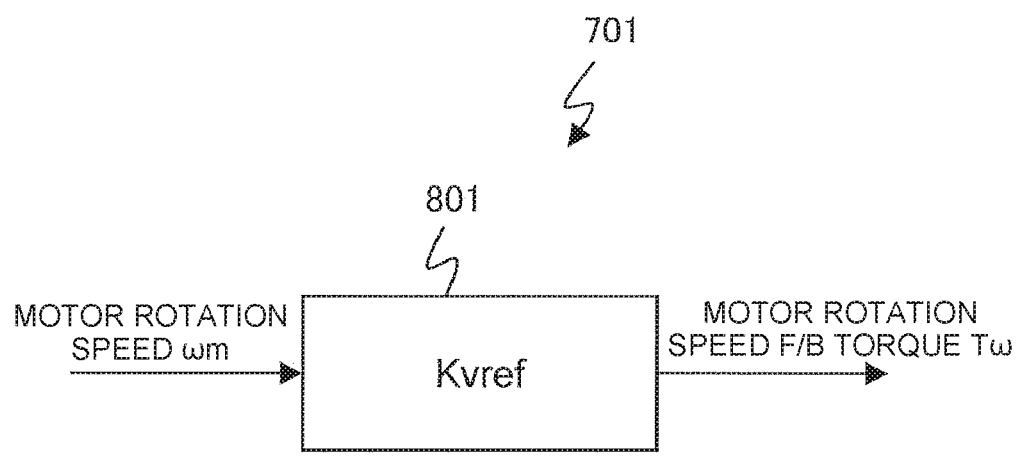
FIG. 8 is a view describing a method for calculating a motor rotation speed F/B torque Tw based on motor rotation speed.

Next, with reference to FIG. 7 and FIG. 8, details of the stop control processing executed in step S203 are described.

FIG. 7 is a block diagram for realizing the stop control processing. The stop control processing is executed by using a motor rotation speed F/B torque setter 701, an adder 702, and a torque comparator 703. Hereinafter, details of each of the components are described.

The motor rotation speed F/B torque setter 701 calculates motor rotation speed feedback torque (hereinafter, referred to as motor rotation speed F/B torque) Tω based on the detected motor rotation speed ωm. The details are given with reference to FIG. 8.

FIG. 8 is a view for describing a method for calculating the motor rotation speed F/B torque Tω based on the motor rotation speed ωm. The motor rotation speed F/B torque setter 701 includes a multiplier 801, and multiplies the motor rotation speed ωm by a gain Kvref, thereby calculating the motor rotation speed F/B torque Tω. The Kvref is a negative (minus) value that is necessary to stop an electric vehicle just before stop of the electric vehicle, and is set as appropriate based on experimental data and so on. The motor rotation speed F/B torque Tω is set as torque that realizes larger braking force as the motor rotation speed ωm becomes higher.

Although the motor rotation speed F/B torque setter 701 is described that it calculates the motor rotation speed F/B torque Tω by multiplying the motor rotation speed ωm by the gain Kvref, the motor rotation speed F/B torque setter 701 may calculate the motor rotation speed F/B torque Tω by using, for example, a regenerative torque table in which regenerative torque is defined with respect to the motor rotation speed ωm, or an attenuation rate table in which an attenuation rate of motor rotation speed ωm is stored in advance.

The description continues referring back to FIG. 7. The adder 702 adds the motor rotation speed F/B torque Tω calculated in the motor rotation speed F/B torque setter 701 to the gradient assist torque calculated in the foregoing gradient correction amount adjuster 403 by multiplying the disturbance torque estimated value Td by a reduction rate of gradient correction amount. Thus, the second target torque value Tm2* is calculated.

Here, with regard to the disturbance torque estimated value Td, details of the control block 505 shown in FIG. 5 are given. The control block 505 is a filter having the transfer characteristic of Hz(s), and executes filtering processing of an output of the adder/subtracter 504 that is input to the control block 505, thereby calculating the disturbance torque estimated value Td.

The transfer characteristic Hz(s) is described. By rewriting Equation 9, next Equation 10 is obtained. However, ζz, ωz, ζp, ωp in Equation 10 are expressed by Equations 11.

[Equation 10]

$$G_p(s) = \frac{Mp(s^2 + 2\zeta_z \cdot \omega_z \cdot s + \omega_z^2)}{s(s^2 + 2\zeta_p \cdot \omega_p \cdot s + \omega_p^2)} \quad (10)$$

[Equation 11]

$$\zeta_z = \frac{b_1'}{2(b_0' \cdot b_2')^{1/2}} \quad (11)$$

$$\omega_z = \left(\frac{b_0'}{b_2'}\right)^{1/2}$$

$$\zeta_p = \frac{a_2'}{2(a_1' \cdot a_3')^{1/2}}$$

$$\omega_p = \left(\frac{a_1'}{a_3'}\right)^{1/2}$$

According to the foregoing, Hz(s) is expressed by next Equation (12) provided that $\zeta_c > \zeta_z$. For example, $\zeta_c > 1$ in order to enhance a vibration suppressing effect in a deceleration scene accompanied by gear backlash.

[Equation 12]

$$H_z(s) = \frac{(s^2 + 2\zeta_z \cdot \omega_z \cdot s + \omega_z^2)}{(s^2 + 2\zeta_c \cdot \omega_z \cdot s + \omega_z^2)} \quad (12)$$

As described above, the disturbance torque estimated value Td according to the embodiment is estimated by a disturbance observer as shown in FIG. 5. However, the disturbance torque estimated value Td may be corrected for higher precision based on a detection value of the longitudinal G sensor 15. Also, a torque conversion value of a gradient resistance component calculated based on a detection value of the longitudinal G sensor 15 may be used as the disturbance torque estimated value Td.

Although air resistance, a modeling error caused by variation of a vehicle mass due to the number of occupants and a load weight, rolling resistance of a tire, gradient resistance of a road surface, and so on are considered as the disturbance, gradient resistance is a dominant disturbance factor especially just before stop of a vehicle. Although the disturbance factors change depending on driving conditions, the foregoing disturbance factors are estimated collectively since the disturbance torque estimator 402 calculates the disturbance torque estimated value Td based on the motor torque command value Tm*, the motor rotation speed ωm, and the transfer characteristic Gp(s). Thus, a vehicle is able to stop smoothly followed by deceleration under any driving condition.

Referring back to FIG. 7, the description continues. The adder 702 calculates the second target torque value Tm2* by adding the motor rotation speed F/B torque Tw calculated by the motor rotation speed F/B torque setter 701 to the gradient assist torque.

The torque comparator 703 compares the magnitudes of the first target torque value Tm1* and the second target torque value Tm2*, and sets the larger target torque value as the motor torque command value Tm*. While a vehicle is traveling, the second target torque value Tm2* is smaller than the first target torque value Tm1*. When the vehicle decelerates and just before stop of the vehicle (at given vehicle speed or slower, or when a speed parameter proportional to vehicle speed becomes a given value or smaller), the second target torque value Tm2* is larger than the first target torque value Tm1*. Therefore, when the first target torque value Tm1* is larger than the second target torque value Tm2*, the torque comparator 703 determines that it is not just before stop of the vehicle yet and sets the first target torque value Tm1* to the motor torque command value Tm*.

Further, when the second target torque value Tm2* becomes larger than the first target torque value Tm1*, the torque comparator 703 determines that it is just before stop of the vehicle, and switches the motor torque command value Tm* from the first target torque value Tm1* to the second target torque value Tm2*. At that moment, the gradient assist torque is set to a value that coincides with the disturbance torque estimated value Td. Therefore, while the second target torque value Tm2* is set to the motor torque command value Tm*, the later-described deceleration control processing is not executed, or a reduction rate of the gradient correction amount is set to 0%. In order to maintain a stopping state of the vehicle, the second target torque value Tm2* is a positive torque on an uphill road and a negative torque on a downhill road, and converges to almost zero on a flat road.

The details of the transfer characteristic $G_p(s)$ and the stop control processing have been described so far. Next, description is given regarding calculation of a reduction rate of the gradient correction amount executed by the gradient correction amount adjuster 403 shown in FIG. 4, and calculation of the gradient assist torque based on the reduction rate of the gradient correction amount.

<Deceleration Control Processing>

Figure 9:
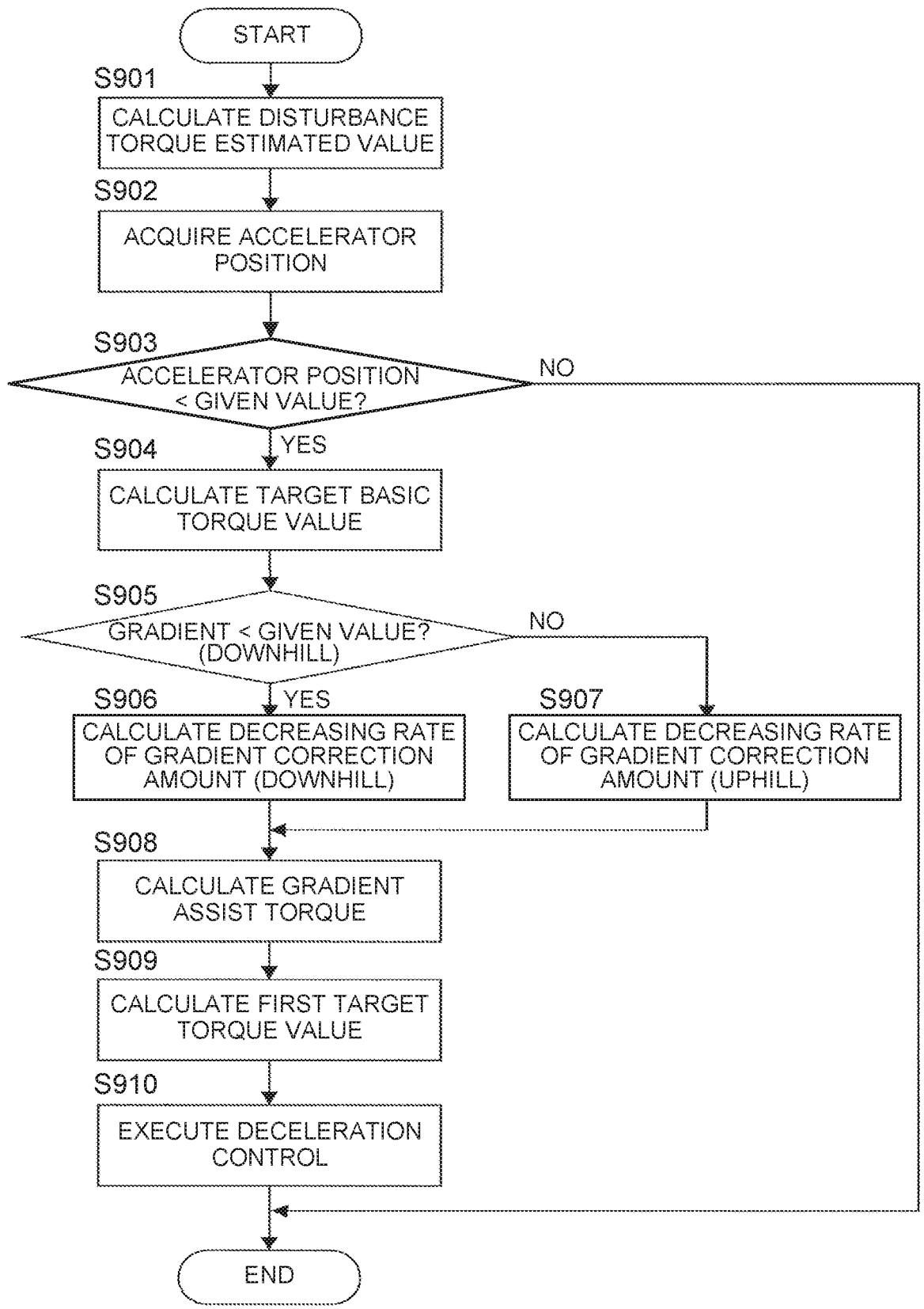
FIG. 9 is a flowchart showing a flow of deceleration control processing.

FIG. 9 is a flowchart showing a flow of the deceleration reduction processing according to the embodiment. The flow is programmed so that it is repeatedly executed by the motor controller 2 in a fixed cycle.

In step S901, the motor controller 2 calculates the disturbance torque estimated value Td. The disturbance torque estimated value Td is calculated by using the disturbance observer described with reference to FIG. 5.

Next, in step S902, the motor controller 2 acquires an accelerator position in order to detect acceleration or deceleration requested by a driver. As described with reference to FIG. 3, a given accelerator position or larger serves as an acceleration request, and positive motor torque (driving torque) is set. Meanwhile, an accelerator position smaller than the given accelerator position serves as a deceleration request, and negative motor torque (braking torque) is set so that regenerative braking force is applied. For example, according to the accelerator position—torque table shown in FIG. 3 as an example, when the accelerator position is ⅛ or smaller, negative motor torque is set, and when the accelerator position is ⅔ or larger, positive motor torque is set. After the accelerator position is acquired, the motor controller 2 executes processing of next step S903.

In step S903, the motor controller 2 determines whether or not a driver is requesting deceleration based on the acquired accelerator position. When the accelerator position is smaller than the given value, in other words, when the accelerator position is smaller than a lower limit value of the accelerator position by which driving torque is set, it is determined that the driver is requesting deceleration. When it is determined that the driver is requesting deceleration, the motor controller 2 executes processing of next step S904 in order to calculate braking torque requested by the driver as the target basic torque value Tm0*.

When the acquired accelerator position is the given value or larger, in other words, when the accelerator position is within a range where driving torque is set, then it is determined that the driver is requesting acceleration, and the deceleration control processing according to this flow is thus ended.

In step S904, the motor controller 2 refers to the accelerator position—torque table shown in FIG. 3 as an example and calculates the target basic torque value Tm0* as driver request torque based on the accelerator position θ and the motor rotation speed ωm. Once the target basic torque value Tm0* is calculated, processing of next step S905 is executed in order to determine whether or not a road surface where the vehicle is traveling is a downhill road.

In step S905, the motor controller 2 determines whether or not a gradient (%) of the road surface is smaller than a given value. Since it is to be determined whether or not the road surface is a downhill road, the given value is set to 0%. As described earlier, a gradient of a road surface can be acquired from the disturbance torque estimated value Td. Also, the disturbance torque estimated value Td is positive torque on an uphill road, negative torque on a downhill road, and almost zero on a flat road. Therefore, in this step, when the disturbance torque estimated value Td is smaller than 0, it is determined that the road surface is a downhill road, and processing of next step S906 is executed. When the disturbance torque estimated value Td is 0 or larger, it is determined that the road surface is not a downhill road, and processing of step S907 is executed.

In step S906, the motor controller 2 calculates a reduction rate of a gradient correction amount while the vehicle is traveling on a downhill road. A method for calculating the reduction rate of the gradient correction amount calculated in this step is detailed with reference to FIG. 10.

Figure 10:
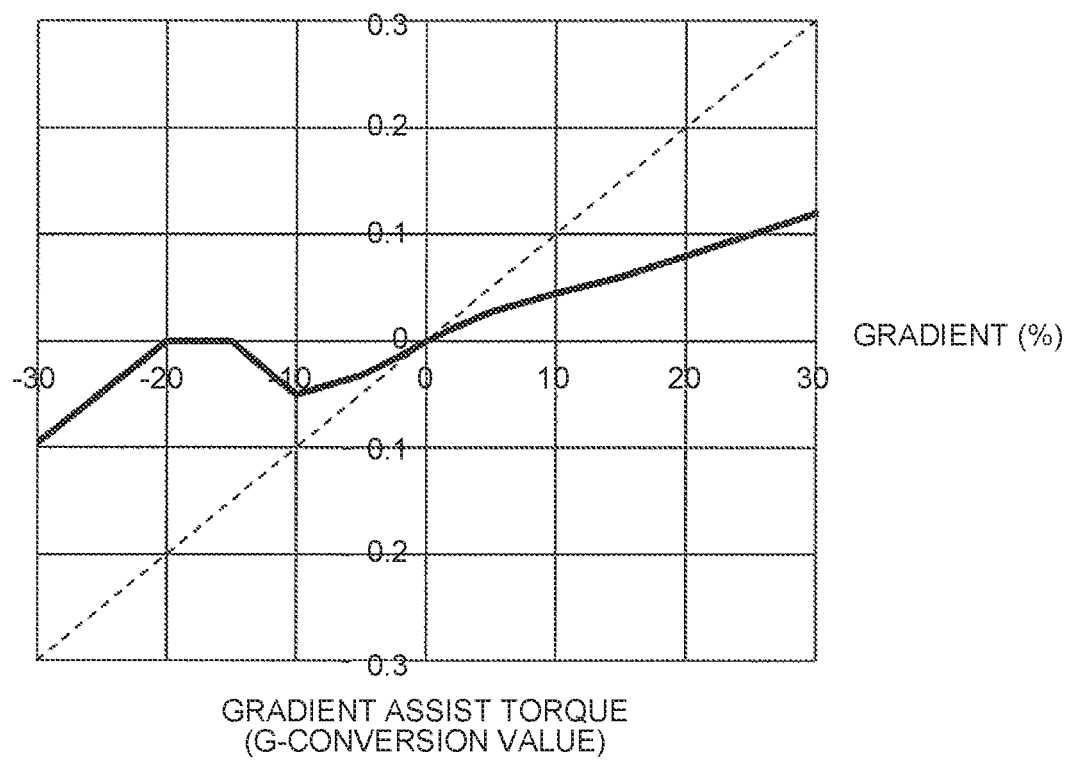
FIG. 10 is a view describing a method for calculating a reduction rate of a gradient correction amount according to the embodiment.

FIG. 10 is a view for describing the method for calculating the reduction rate of the gradient correction amount. A horizontal axis represents a gradient (%), and a vertical axis represents a G-conversion value of the gradient assist torque. The gradient (%) in a positive value represents an uphill road, and the gradient (%) in a negative value represents a downhill road. Also, the larger an absolute value of the gradient (%) is, the steeper the gradient is.

A broken line shown in FIG. 10 represents gradient assist torque that almost coincides with gradient resistance of a road surface, and indicates the disturbance torque estimated value Td before the deceleration reduction processing is executed. This means that the broken line shows gradient assist torque when 100% of gradient assist is executed, in other words, a reduction rate of the gradient correction amount is 0%. A solid line shows gradient assist torque according to the embodiment. The gradient assist torque is calculated by multiplying the disturbance torque estimated value Td by the reduction rate of the gradient correction amount calculated in this step. The solid line shown in negative gradients (%) on the horizontal axis in FIG. 10 (the left half in the drawing) represents gradient assist torque on a downhill road.

As shown in the drawing, in the embodiment, on a road with a relatively moderate gradient to about −10(%), the reduction rate of the gradient correction amount is set to about 50%, and a gradient assist amount is almost halved. Thus, while a driver is able to feel that the vehicle is traveling on a downhill road, an accelerator operation amount by the driver for generating braking force can be reduced.

Next, the reduction rate of the gradient correction amount on a downhill road at a gradient of from −10(%) to −20(%) is calculated so as to increase from 50% up to 100%. As described earlier, the upper limit value of the gradient assist torque according to the embodiment is a torque value that enables a vehicle to stop when the accelerator position is fully closed on a −10(%) gradient road. This means that, a vehicle to which the electric vehicle control device according to the embodiment is applied can be stopped only by a driver's accelerator operation until a road gradient reaches −10(%).

On the other hand, on a downhill road steeper than the gradient of −10(%), the vehicle cannot be stopped with an accelerator operation only even when the reduction rate of the gradient correction amount is 0%, and a brake operation is thus required. Therefore, in the embodiment, on a downhill road that is steeper than the gradient of −10(%) that is the lower limit gradient (%) where a brake operation is required in order to stop a vehicle, restraint of a sense of discomfort felt by a driver is prioritized, and the reduction rate of the gradient correction amount is increased in order to reduce a gradient correction amount.

Specifically, the reduction rate of the gradient correction amount according to the embodiment is calculated so that the reduction rate of the gradient correction amount increases linearly from 50% to 100% when a gradient changes from −10(%) through −15(%), and that the reduction rate is maintained at 100% until a gradient reaches −20(%). However, in the embodiment, it is only necessary that the reduction rate of the gradient correction amount increases when a gradient changes from −10(%) to a gradient of −20(%), and that the reduction rate of the gradient correction amount becomes about 100% when a gradient is −20(%), and changes in the reduction rate of the gradient correction amount are not particularly limited as long as the changes are continuous. Further, when a gradient is −10(%), the reduction rate of the gradient correction amount is not limited and does not need to be 50%.

The reason why the gradient of −10(%) is described as a gradient that serves as a point where the reduction rate of the gradient correction amount starts to increase is because the upper limit value of the gradient assist torque is set as a torque value that enables a vehicle to stop when an accelerator position is completely closed on a −10(%) gradient road. This means that a given gradient that serves as a point where the reduction rate of the gradient correction amount starts to increase is set to a maximum value of a gradient at which a vehicle can be stopped by braking torque that is obtained by adding a previously-set upper limit value of gradient assist torque to braking force generated in the vehicle when the accelerator operation amount is 0. Therefore, when a value set as an upper limit of the gradient assist torque is changed, the given gradient (%) is also changed accordingly.

Then, at a steep gradient steeper than −20(%), the reduction rate of the gradient correction amount is reduced. In the embodiment, the reduction rate of the gradient correction amount that is 100% at a gradient of −20(%) is reduced linearly, and set to be a reduction rate of about 30% at a gradient of −30(%).

Here, the reason why the reduction rate of the gradient correction amount is set to 100% at a gradient of −20(%) is described. In the accelerator position—torque table shown in FIG. 3, when the accelerator position is 0 (fully closed), braking force of about 0.2G is generated. Then, gradient resistance at the gradient of −20(%) is about 0.2G as a G-conversion value in an advancing direction. This means that, according to the accelerator position—torque table shown in FIG. 3, when the reduction rate of the gradient correction amount is set to 100% at the gradient of −20(%), it is possible to match braking force generated in a vehicle when an accelerator position is 0 (fully closed) at the gradient of −20(%) and gradient resistance acting on the vehicle. Further, because a human instinctively feels that a downhill road at −20(%) gradient is considerably steep, almost no regular driver would request acceleration by stepping on an accelerator pedal, and, in most cases, a regular driver would request deceleration by fully closing the accelerator position.

Therefore, with the gradient up to −20(%), a vehicle would not accelerate at a fully-closed accelerator position even when the reduction rate of the gradient correction amount is about 100%. Therefore, it is possible to eliminate a scene where a vehicle accelerates against a driver's deceleration request by an accelerator operation.

Meanwhile, on a downhill road at a gradient steeper than −20(%), gradient resistance is larger than braking force generated when the accelerator position is fully closed. Therefore, the vehicle accelerates even when the accelerator position is fully closed. Hence, the reduction rate of the gradient correction amount is reduced so that acceleration becomes 0 or smaller when the accelerator position is fully closed, thereby increasing the gradient assist amount. Thus, while a vehicle is traveling on a relatively steep downhill road, a driver is not given feeling of anxiety as the vehicle accelerates even though an accelerator operation amount is 0. Therefore, on a downhill road at a steep gradient, it is possible to secure drive feeling with a sense of security, and, when the driver intends to stop the vehicle, the driver is encouraged to perform a brake operation.

The method for calculating the reduction rate of the gradient correction amount on a downhill road has been described. However, the specific numbers stated above are values calculated based on the accelerator position—torque table shown in FIG. 3 as an example, and the numbers are changed as needed in accordance with changes in the values of the accelerator position—torque table. Further, the reduction rate of the gradient correction amount may be calculated as appropriate in accordance with the accelerator position—torque table and a road surface gradient (%), or may be calculated from a road surface gradient (%) with reference to a table that is stored in advance in which a relation between the reduction rate of the gradient correction amount and a road surface gradient (%) is obtained in accordance with the accelerator position—torque table.

Referring back to FIG. 9, the description continues.

In step S905, when the disturbance torque estimated value Td is 0 or larger, it is determined that a road surface is not a downhill road. Therefore, processing of step S907 is executed in order to calculate the reduction rate of the gradient correction amount on an uphill road.

In step S907, the motor controller 2 calculates the reduction rate of the gradient correction amount on an uphill road. In the embodiment, a solid line shown in the positive gradient (%) on the horizontal axis in FIG. 10 represents the reduction rate of the gradient correction amount on an uphill road. As shown in the drawing, the reduction rate of the gradient correction amount on an uphill road according to the embodiment is set to about 50%. With this setting, the gradient assist amount is almost halved on an uphill road, and it is thus possible to reduce an accelerator operation amount for generating braking force while making a driver feel that the vehicle is traveling on an uphill road.

In step S908, gradient assist torque is calculated by multiplying the disturbance torque estimated value Td by the foregoing reduction rate of the gradient correction amount. After the gradient assist torque is calculated, the motor controller 2 executes processing of next step S909.

In step S909, the motor controller 2 calculates the first target torque value Tm1*. To be more specific, as shown in FIG. 4, the first target torque value Tm1* is calculated by adding the target basic torque value Tm0* as driver request torque, and the gradient assist torque calculated in step S908. Then, during normal driving time when it is not just before stop of a vehicle, the first target torque value Tm1* is set to the motor torque command value Tm* (see FIG. 7).

Then, in step 910, the motor controller 2 executes vehicle braking control based on a driver's deceleration request by controlling the motor 4 with the first target torque value Tm1* that is set as the motor torque command value Tm*.

Figure 11:
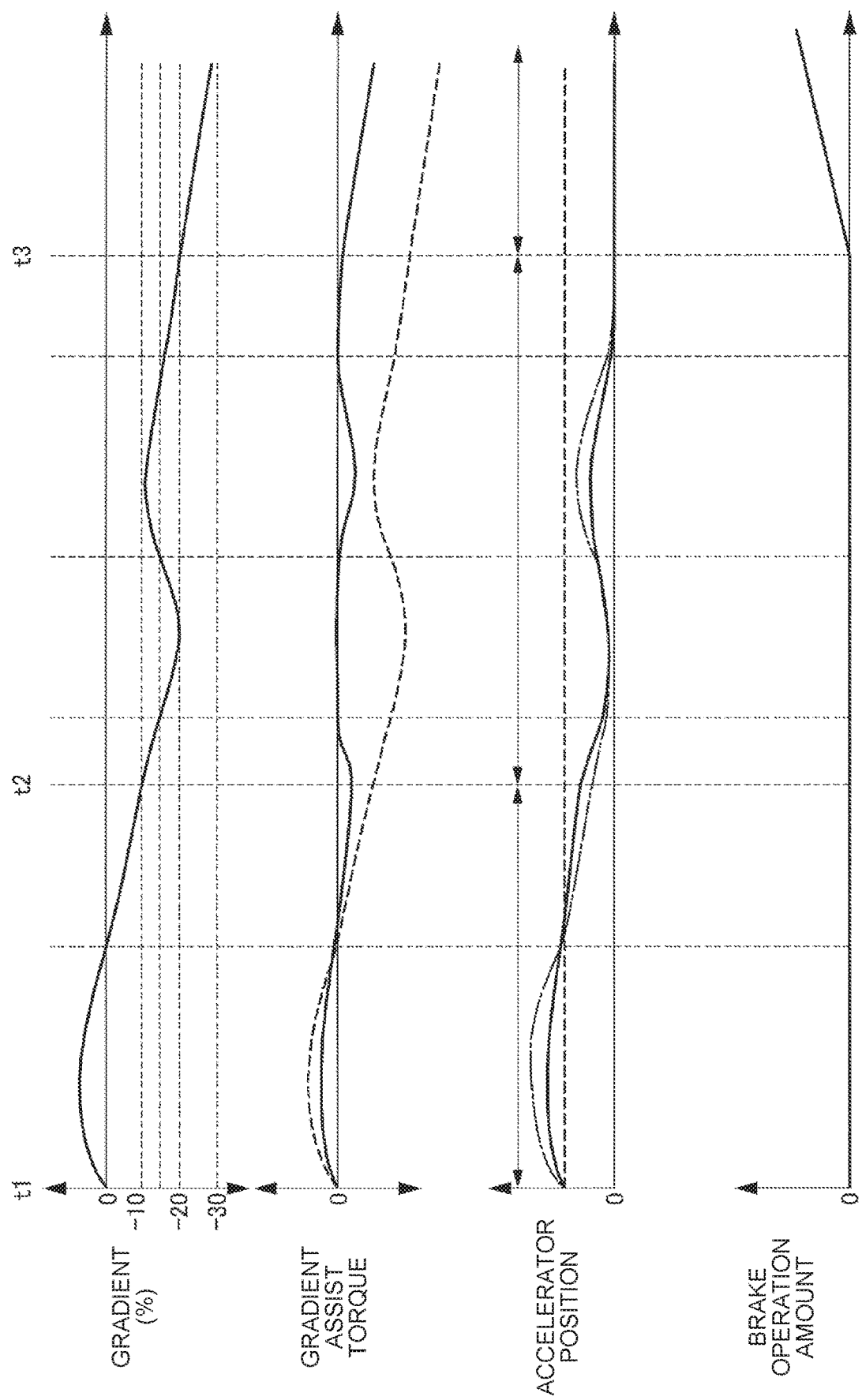
FIG. 11 is a view of an example of a result of control by the electric vehicle control device according to the embodiment.

With reference to FIG. 11, description is given regarding effects when the electric vehicle control device according to the embodiment described so far is applied to an electric vehicle.

FIG. 11 is a time chart that describes an example of a result of control by the electric vehicle control device according to the embodiment. FIG. 11 shows a gradient (%) of a road surface on which a vehicle is traveling, an accelerator or brake operation amount by a regular driver while a vehicle is traveling on a gradient road, and gradient assist torque calculated in accordance with the gradient of the road and the operation amount while the vehicle is travailing at a fixed vehicle speed. The gradient (%), the gradient assist torque, the accelerator position, and the brake operation amount are shown in this order from above. A positive gradient (%) represents an uphill road, a negative gradient (%) represents a downhill road, and the larger the absolute value of the gradient (%) is, the steeper the gradient is.

Further, in the drawing, a broken line that represents the gradient assist torque shows gradient assist torque when the reduction rate of the gradient correction amount is always 0, in other words, the disturbance torque estimated value Td that almost coincides with gradient resistance.

Further, in the drawing, a broken line that represents the accelerator position indicates an accelerator operation amount when the reduction rate of the gradient correction amount is always 0%, in other words, when the deceleration control processing is not executed. Then, a dashed line in the drawing indicates an accelerator operation amount by a regular driver when the reduction rate of the gradient correction amount is always 100%, in other words, when the gradient correction is not executed.

At t1 to t2, a gradient of a road surface changes from an uphill road to −10(%) downhill road. Then, when the deceleration control processing is not executed, the gradient assist torque coincides with the disturbance torque estimated value Td as shown by the broken line in the drawing. In this case, because the gradient resistance component is canceled by the gradient assist torque, the accelerator position by the driver becomes constant.

On the other hand, since the reduction rate of the gradient correction amount according to the embodiment of the present invention is set to 50%, the gradient assist torque is almost halved compared to a case where the deceleration control processing is not executed, thereby making a driver feel that the vehicle is traveling on a gradient road with an appropriate assist amount. Meanwhile, an accelerator operation amount is halved compared to a case where the gradient correction is not executed. Thus, by setting the reduction rate of the gradient correction amount to about 50% on an uphill road through a relatively gentle downhill road, it is possible to reduce an accelerator operation amount compared to the case where the gradient correction is not executed while making a driver feel that the vehicle is traveling on a gradient road without a sense of discomfort.

At t2 to t3, a vehicle travels on a relatively steep downhill road in which the road surface gradient changes in a range from −10(%) to −20(%). In this case, in a case where the deceleration control processing is not executed, the gradient resistance component is canceled by the gradient assist torque. Therefore, in a situation where a steep gradient changes to an even steeper gradient while the accelerator position stays the same, braking force (deceleration) is increased, and a driver is given a sense of discomfort of the control.

On the other hand, the reduction rate of the gradient correction amount according to the embodiment of the present invention increases as a gradient becomes steeper, and becomes 100% at a gradient steeper than −15(%). Therefore, because the gradient assist amount is reduced as the gradient gets steeper, it is possible to remove a sense of discomfort about an increase in braking force. Further, in order to maintain or reduce vehicle speed on a steep downhill road, it is necessary to reduce an accelerator position. As a result, the driver is in charge of the braking control and thus does not have a sense of discomfort from the driver's accelerator operation. Further, since an appropriate gradient assist is made at a gradient gentler than −15(%), it is possible to reduce an accelerator operation amount by the driver compared to a case where the gradient correction is not executed (the dashed line).

At t3 or later, the vehicle travels on a downhill road at the road surface gradient steeper than −20(%). Then, in the case where the deceleration control processing is not executed, the gradient resistance component is canceled by the gradient assist torque similarly to the foregoing. Therefore, constant vehicle speed is maintained although the accelerator position is constant.

On the other hand, the reduction rate of the gradient correction amount according to the embodiment of the present invention is reduced to a value that does not make a vehicle accelerate even when the accelerator position is 0 on a downhill road steeper than −20(%), thereby increasing the gradient assist amount. Thus, on a gradient road steeper than −20(%), an increase in vehicle speed with a fully-closed accelerator position is restrained. Hence, it is possible to remove anxiety that can be felt on a downhill road with a steep gradient when a vehicle accelerates with the fully-closed accelerator position, thereby improving a sense of security of a driver. Further, when a driver intends to decelerate or stop a vehicle, the driver can be encouraged to move to a brake pedal operation from the situation where the accelerator pedal is fully closed.

As described so far, the electric vehicle control device according to the embodiment is a control device that includes the motor 4 that gives braking force or driving force to a vehicle in accordance with an accelerator operation, and realizes an electric vehicle control method by which the braking force is controlled when an accelerator operation amount is smaller than a given value and the driving force is controlled when the accelerator operation amount is the given value or larger. The electric vehicle control device estimates disturbance torque that acts on the motor 4 as resistance component relating to a gradient and executes correction by which the braking force or the driving force is increased or decreased so as to cancel the resistance component in accordance with a disturbance torque estimated value Td. Then, on a downhill road at a given gradient or more, a correction amount of the braking force or the driving force is reduced. A downhill road at the given gradient or more means a downhill road that is at the given gradient or at a gradient steeper than the given gradient. Thus, on a gradient road, while reducing a driver's accelerator operation amount that is required in order to realize a driver's acceleration/deceleration request, a gradient correction amount is reduced to an appropriate gradient correction amount on a downhill road at a relatively steep gradient, thereby restraining a sense of discomfort felt by a driver.

With the electric vehicle control device according to the embodiment, when an upper limit value of a correction amount (a gradient assist amount) is set, the given gradient at which the correction amount is reduced is set to a maximum value of a gradient at which a vehicle is able to stop with braking torque obtained by adding the correction amount at the upper limit value to braking force generated in the vehicle when the accelerator operation amount is 0. Thus, a situation where the gradient correction amount is reduced happens only on a downhill road where brake operation is necessary anyway in order to stop the vehicle. Therefore, it is not necessary to increase brake operations due to a reduction in the gradient correction amount, and it is thus possible to restrain a sense of discomfort felt by a driver.

Further, with the control device for the electric vehicle according to the embodiment, on a downhill road at a given steep gradient or more, the steep gradient being steeper than the foregoing given gradient, the correction amount (a gradient assist amount) is set so that acceleration of a vehicle becomes 0 or smaller due to braking force generated in the vehicle when an accelerator operation amount is 0. Further, the foregoing steep gradient is set to a gradient at which vehicle acceleration becomes 0 due to braking force generated in the vehicle when the accelerator operation amount is 0. Thus, on a downhill road at the steep gradient, it is possible to restrain acceleration of the vehicle even when the accelerator position is completely closed. Therefore, it is possible to give a driver a sense of security regarding controlling of braking force of the vehicle only by an accelerator operation, while restraining a sense of discomfort felt by a driver by reducing a gradient correction amount.

The electric vehicle control device according to the embodiment of the present invention has been described so far. However, the present invention is not limited to the foregoing embodiment, and various deformations and applications are possible. For example, although the configuration of the control block for calculating the first target torque value Tm1* is described with reference to FIG. 4, it is not necessary to provide all of the components shown in FIG. 4, and, for example, the rate limiter 405 and the low pass filter 406 may be omitted.

Further, in the foregoing description, when the accelerator operation amount is the given value or smaller, and also it is just before stop of the electric vehicle, the stop control is executed by which the motor torque command value Tm* converges to the corrected disturbance torque estimated value Td (the disturbance assist torque) as rotation speed of the motor 4 is reduced. However, since speed parameters such as wheel speed, vehicle body speed, and rotation speed of the drive shaft have a proportional relation with rotation speed of the motor 4, the motor torque command value Tm* may converge to the disturbance torque estimated value Td as the speed parameters proportional to rotation speed of the motor 4 are lowered. Also, in the first place, it is not always necessary to execute the foregoing stop control just before stop of a vehicle, and the stop control processing according to step S203 in FIG. 2 may be omitted.

The invention claimed is:

1. A control method for an electric vehicle that is provided with a motor that gives braking force or driving force to the vehicle in accordance with an accelerator operation amount, controls the braking force when the accelerator operation amount is smaller than a given value, and controls the driving force when the accelerator operation amount is the given value or larger, the control method comprising:
    estimating disturbance torque that acts on the motor as a resistance component relating to a gradient;
    executing correction by which the braking force or the driving force is increased and decreased in order to cancel the resistance component in accordance with an estimated value of the disturbance torque;
    reducing a correction amount of the braking force or the driving force on a downhill road at a given or steeper gradient; and
    calculating an upper limit value of the correction amount based on a torque value that enables the vehicle to stop when the accelerator operation amount is 0 at the given gradient.

2. The control method for the electric vehicle according to claim 1, wherein,
    when an upper limit value of the correction amount is set, the given gradient is set to a maximum value of a gradient at which the vehicle is able to stop by braking torque that is obtained by adding the correction amount at the upper limit value to the braking force generated in the vehicle when the accelerator operation amount is 0.

3. The control method for the electric vehicle according to claim 1, wherein,
    on a downhill road at a given steep gradient that is steeper than the given gradient, the correction amount is set so that acceleration of the vehicle becomes 0 or smaller due to the braking force generated in the vehicle when the accelerator operation amount is 0.

4. The control method for the electric vehicle according to claim 3, wherein the steep gradient is set to a gradient with which acceleration of the vehicle becomes 0 due to the braking force generated in the vehicle when the accelerator operation amount is 0.

5. A control device for an electric vehicle that is provided with a motor that gives braking force or driving force to the vehicle in accordance with an accelerator operation amount, and a controller that controls the braking force when the accelerator operation amount is smaller than a given value, and controls the driving force when the accelerator operation amount is the given value or larger, wherein the control device:
    estimates disturbance torque that acts on the motor as a resistance component relating to a gradient;
    executes correction by which the braking force or the driving force is increased and decreased so as to cancel the resistance component in accordance with an estimated value of the disturbance torque;
    reduces a correction amount of the braking force or the driving force on a downhill road at a given or steeper gradient; and
    calculates an upper limit value of the correction amount based on a torque value that enables the vehicle to stop when the accelerator operation amount is 0 at the given gradient.

* * * * *